(12) United States Patent
Fox et al.

(10) Patent No.: US 7,039,052 B2
(45) Date of Patent: May 2, 2006

(54) SELECTIVE ROUTING OF MULTI-RECIPIENT COMMUNICATIONS

(75) Inventors: James E. Fox, Apex, NC (US); Michael J. Fox, New Hill, NC (US); Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 09/955,905

(22) Filed: Sep. 19, 2001

(65) Prior Publication Data

US 2003/0053457 A1    Mar. 20, 2003

(51) Int. Cl.
*H04L 12/28* (2006.01)
*H04L 12/56* (2006.01)
*H04J 3/16* (2006.01)
*H04J 3/22* (2006.01)
*G06F 15/173* (2006.01)

(52) U.S. Cl. ............... 370/390; 370/392; 370/466; 709/223

(58) Field of Classification Search ........ 370/252–352, 370/389–395, 401–469; 709/204–223, 231–246
See application file for complete search history.

(56) References Cited

U.S. PATENT DOCUMENTS

| | | | |
|---|---|---|---|
| 5,361,256 A | * | 11/1994 | Doeringer et al. .......... 370/390 |
| 5,634,011 A | | 5/1997 | Auerbach et al. ...... 395/200.15 |
| 5,812,552 A | | 9/1998 | Arora et al. ............... 370/401 |
| 5,831,975 A | | 11/1998 | Chen et al. ................ 370/256 |
| 5,835,723 A | | 11/1998 | Andrews et al. ....... 395/200.56 |
| 5,940,391 A | | 8/1999 | Malkin et al. ............. 370/390 |
| 5,959,989 A | | 9/1999 | Gleeson et al. ............ 370/390 |
| 5,968,126 A | | 10/1999 | Ekstrom et al. ........... 709/225 |

(Continued)

OTHER PUBLICATIONS

"Introduction" to Multicast Backbone, 2 pp. excerpted from a website at URL http://epubl.luth.se (printed Jul. 6, 2001).

(Continued)

*Primary Examiner*—Man U. Phan
(74) *Attorney, Agent, or Firm*—Synnestvedt & Lechner LLP; Gerald R. Woods

(57) ABSTRACT

A method and apparatus for selective routing of a multi-recipient communication from an origin domain to a destination domain within a communications network. An exit routing station added to the origin domain receives a datagram including content data intended for multi-recipient delivery in the destination domain. The exit routing station modifies the datagram for routing to the destination domain, and transmits it to the entry routing station. This enables delivery to the destination domain by other than multi-recipient techniques. An entry routing station added to the destination domain modifies the datagram for multi-recipient delivery in the destination domain and initiates multi-recipient delivery. The destination domain's entry routing station may modify the datagram with information specific to the destination domain and unknown to the origin domain. Accordingly, no revisions to software applications employing multi-recipient technology is required, and destination domains otherwise unreachable by traditional multi-recipient techniques may be reached.

5 Claims, 5 Drawing Sheets

U.S. PATENT DOCUMENTS

| | | | | |
|---|---|---|---|---|
| 6,041,166 | A | 3/2000 | Hart et al. | 395/200.68 |
| 6,092,220 | A | 7/2000 | Palmer et al. | 714/43 |
| 6,115,385 | A * | 9/2000 | Vig | 370/401 |
| 6,115,394 | A * | 9/2000 | Balachandran et al. | 370/477 |
| 6,483,853 | B1 * | 11/2002 | Kshirsagar et al. | 370/466 |
| 6,732,189 | B1 * | 5/2004 | Novaes | 709/249 |
| 6,754,211 | B1 * | 6/2004 | Brown | 370/389 |
| 6,788,681 | B1 * | 9/2004 | Hurren et al. | 370/389 |
| 6,788,701 | B1 * | 9/2004 | Mahalingaiah et al. | 370/429 |
| 6,822,958 | B1 * | 11/2004 | Branth et al. | 370/390 |
| 6,862,279 | B1 * | 3/2005 | Imai et al. | 370/390 |
| 2002/0023152 | A1 * | 2/2002 | Oguchi | 709/223 |
| 2002/0067730 | A1 * | 6/2002 | Hinderks et al. | 370/395.52 |
| 2002/0089943 | A1 * | 7/2002 | Faineant et al. | 370/319 |

OTHER PUBLICATIONS

"Summary and Conclusions" to Multicast Backbone, 1 p. excerpted from a website at URL, http://epubl.luth.se (printed Jul. 6, 2001).

"How IP Multicast Works", 8 pp. excerpted from website at URL http://www.ipmutlicast.com (printed Jul. 5, 2001).

"IP Multicast backgrounder", 6 pp. excerpted from a website at URL, http://www.stardust.com (printed Jul. 5, 2001).

Introduction to IP Multicast Routing, 10 pp. excerpted from a website at URL, http://www.ipmulticast.com (printed Jul. 5, 2001).

\* cited by examiner

SELECTIVE ROUTING OF MULTI-RECIPIENT COMMUNICATIONS

FIELD OF THE INVENTION

The present invention relates generally to communications networks, and particularly to multi-recipient communication in computer networks.

BACKGROUND OF THE INVENTION

Communications networks, such as the Internet or intranets, connect hosts that may communicate via the network. Such networks often use the Internet Protocol (IP) by which a communication, e.g. a message, file or other data unit, is sent between host computers, each having at least one unique IP address that includes an identification of a network and an identification of the host on that network. Gateways or routers (collectively "routers") route the communication to the intended destination address. The IP routing protocol requires a complementary communications protocol to enable communications between hosts on a network.

The Transmission Control Protocol (TCP) is one such complementary communications protocol. In a TCP environment, a sender's TCP program layer divides a message/file into numbered packets (data units) and passes them to the IP program layer. TCP is a highly reliable delivery protocol.

The User Datagram Protocol ("UDP") is an alternative complementary communications protocol. Unlike TCP, UDP does not divide a message into packets, reassemble packets, or track packet sequence. Rather, UDP treats each datagram (data unit) as a whole message.

TCP is suitable for unicast (point-to-point) communications sent from a single sender to a single recipient. However, TCP is unsuitable for multi-recipient (point-to-multipoint) communications that are sent from a single sender to multiple recipients using an address that refers to multiple hosts on a network and causes delivery of the communication to each of the those hosts. Multi-recipient communications include broadcast and multicast communications. Various multicast techniques exist, including hardware-based multicast and IP-based multicast. Both multicasting techniques use a communication's destination address to specify multicast delivery. UDP uses "best effort" delivery methods and therefore is not as reliable as TCP. However, this makes UDP ideal for use with multi-recipient communications. UDP is often used in corporate networks for multi-recipient communications or other applications in which highly reliable delivery is inefficient or unnecessary.

FIG. 1 illustrates an example in which a single network is divided into a group of subnetworks by allowing a single network address to span multiple physical subnetworks. This is common in corporate intranets and allows for hierarchical routing of communications. In the example of FIG. 1, a corporation has a single network address of 128.10.0.0 to which communications may be sent for unicast delivery to hosts within network 10. The network 10 includes two subnetworks 11, 12 having addresses 128.10.1.0 and 128.10.2.0 respectively. For example, 128.10.1.0 may correspond to a company's subnetwork in the U.S. and 128.10.2.0 may correspond to the company's subnetwork in Japan. A gateway or router 20 is connected to the Internet 22 and is capable of making routing decisions to hosts, e.g. 14, 15, 16, 17, 18, 19, based on the third octet of the destination IP address of a given communication.

Known multi-recipient techniques may be used for delivery within a single multi-recipient domain, which often corresponds to a single network or subnetwork. This is inherent to the hierarchical nature of the IP addressing scheme. In the example of FIG. 1, a multicast message may be sent to all hosts 14, 15 in the U.S. subnetwork 11, or to all hosts 16, 17 in the Japanese subnetwork 12.

However, known multi-recipient techniques are inadequate for selective multi-recipient delivery across multiple domains, e.g. a single multicast to hosts 14, 15, 16, 17 within both the Japanese and U.S. subnetworks 11, 12. For example, due to limitations typically imposed on time-to-live (TTL) and/or the maximum number of hops for a multicast (typically 1), a multicast message would not be deliverable from the US to Japan. Such limitations are imposed to limit the amount of network utilization and prevent network congestion, i.e. to prevent unintended massive broadcast/multicast.

A broadcasting technique may allow delivery across multiple multicast domains where such limits are not exceeded, but not without hitting additional subnetworks and therefore sending the message to unintended recipients. For example, consider that the network 10 in the example of FIG. 1 also includes a third subnetwork 13 including hosts 18 and 19. Using standard broadcasting techniques, a single communication may be easily delivered to all hosts within a single network, e.g. 128.10.0.0, or to all hosts within a single subnet stemming from address 128.10.0.0. However, such techniques are inadequate for selective targeting of messages across domains, e.g. for broadcasting to fewer than all subnets of a network or between subnets of different networks, there being no relationship of IP addresses that may be interpreted by standard multicast techniques to provide a targeted multicast message.

Known multi-recipient techniques are unsatisfactory for sending a single, targeted multi-recipient communication to hosts within subnet 128.10.1.0 and 128.10.2.0 without also delivering the communication to all hosts in subnet 128.10.3.0. Within a single company, this may unnecessarily congest networks. For example, a communication relating to a departmental lunch meeting in Japan would be broadcast to all hosts in US and Japan. Across networks or subnetworks of different companies it may be extremely undesirable as many unintended recipients could receive the message, including those outside of the sender's or recipient's company or entity.

IP tunneling combines unicast and multi-recipient delivery, and may combine TCP and UDP techniques. IP tunneling is known for use in the multicast context. Such tunneling refers to the encapsulation of multicast packets in an IP datagram (i.e. unicast packet) to route through parts of a network that don't support multicast routing. The encapsulation is added on entry to a tunnel and stripped off on exit from a tunnel. More specifically, the packet is wrapped, sent through a unicast tunnel, unwrapped, and then resent in the destination subnet.

However, IP tunneling as known in the art is not "intelligent." The packet is simply transmitted in the destination subnet in the form, or substantially the form, in which is was sent. There is no intelligent customization or configuration of the packet for the destination network. This is due in part to the lack of knowledge at the sender of routing and other information specific to the destination subnetwork. Accordingly, there are limits inherent to tunneling, including that the packets are subject to restrictions from the origin network. For example, when a multicast packet is sent with a TTL of 1, as is often the case, the TTL is decremented to 0 upon receipt at a recipient in the origin network and therefore is not forwardable or receivable in the destination network because the TTL of 0 prevents any additional hops. Additionally, the packet may not be properly configured to specify port numbers, multicast addresses, etc. specific to the destination network. For example, the packet may be configured for multicast on address X in the origin network but all hosts in the destination network are configured to listen for multicast on address Y. Furthermore, IP tunneling involves point-to-point communication, and not point-to-multipoint/multi-subnetwork communication.

SUMMARY OF THE INVENTION

The present invention provides a method and apparatus for selective routing of multi-recipient communications that is compatible with existing software adapted to use existing multi-recipient communication techniques. The present invention allows for selective routing of messages across domains, e.g. across networks and/or subnetworks, without running afoul of typical TTL or hop limitations, and without being hampered by firewalls. Additionally, the present invention provides an opportunity for intelligent modification of data units for delivery in the destination network.

More specifically, the present invention provides a method for selective routing of a multi-recipient communication from an origin domain to one or more destination domains of a communications network. In accordance with the present invention, an origin domain, or subnetwork, is configured to include a specially configured exit routing station, e.g. a server specially configured to carry out the present invention. The exit routing station is part of a broadcast/multicast group in the origin domain. The exit routing station may include a rules-based engine for directed a communication to one or more destination domains. The destination domain, or subnetwork, is configured to include a specially configured entry routing station, e.g. a server specially configured to carry out the present invention. The entry routing station is capable of initiating multi-recipient delivery in the destination domain.

In accordance with the inventive method, the exit routing station receives a datagram including content data intended for multi-recipient delivery in the destination domain. It then modifies the datagram to make it routable from the exit routing station of the origin domain to the entry routing station of the destination domain. The modified datagram is then transmitted via the communications network, e.g. via RMI or HTTP sockets, tunneling or any type of unicast transport, to an entry routing station of the destination domain. Optionally, an additional layer of security may be provided by employing encryption of this transmission, and firewalls may be traversed as known in the art.

In accordance with the inventive method, the entry routing station receives the modified datagram and modifies it to make a reconstructed datagram suitable for multi-recipient routing in the destination domain, e.g. by applying a new header. The hew header may be intelligently configured for the destination domain using the entry routing station's knowledge of the destination domain. The entry routing station then initiates multi-recipient delivery of the reconstructed datagram in the destination domain, using standard multi-recipient techniques. Accordingly, no revisions are required to existing software applications employing multi-recipient technology.

In this manner, one or more selected domains or subnets may be targeted for multi-recipient delivery by specially configuring the exit routing stations to transmit to the entry routing station of the selected domain(s). Accordingly, the sender in any origin domain and the receiver in any destination domain may act as if they are in a single domain. This allows for a significant amount of network utilization savings without the limitations associated with known multi-recipient techniques. Additionally, it is ensured that the message is properly configured for delivery in the destination domain.

DETAILED DESCRIPTION

Conceptually, the present invention provides a recipient in an origin subnetwork for receiving a communication by traditional communication methods. At this stage, the communication is not properly configured for the transmission outside the origin subnetwork. Accordingly, the recipient is configured to modify the communication, e.g. by removing, encapsulating, or modifying a header or header data, to render it suitable for transmission from the origin subnetwork to a destination subnetwork, and to transmit the modified message to the destination subnetwork. A recipient is provided in the destination network for receiving the modified transmitted communication. Although the modified message may be properly configured for transmission to the destination network, it is likely not properly or optimally configured for transmission, particularly by multi-recipient communication techniques, within the destination domain. Accordingly, the recipient in the destination network modifies the communication, e.g. by stripping a header and adding a new header, by unwrapping and/or adding a new header, or by modifying the header, to render it suitable for delivery in the destination network, e.g. by multi-recipient communication techniques, and transmits the message within the destination network.

More specifically, local single or multi-recipient communication within an origin domain is performed as generally known in the art. In accordance with the present invention, an exit routing station is provided within the origin domain for receiving the communication. The exit routing station modifies the communication as necessary to permit unicasting, e.g. by reliable TCP, to the destination domain. For example, this may involve modifying a multi-recipient communication to make a single recipient communication. The exit routing station transmits the communication to an entry routing station of the destination domain. The entry routing station receives and modifies the unicast communication as appropriate, e.g. using knowledge of the destination network to properly configure the message for local multi-recipient communication in the destination domain. This allows for intelligent multi-recipient delivery in a destination domain to ensure multi-recipient delivery, which is particularly important for ensuring delivery in view of UDP's "best efforts" delivery methodology. The entry routing station then transmits the communication within the destination domain to the intended recipients.

Figure 1:
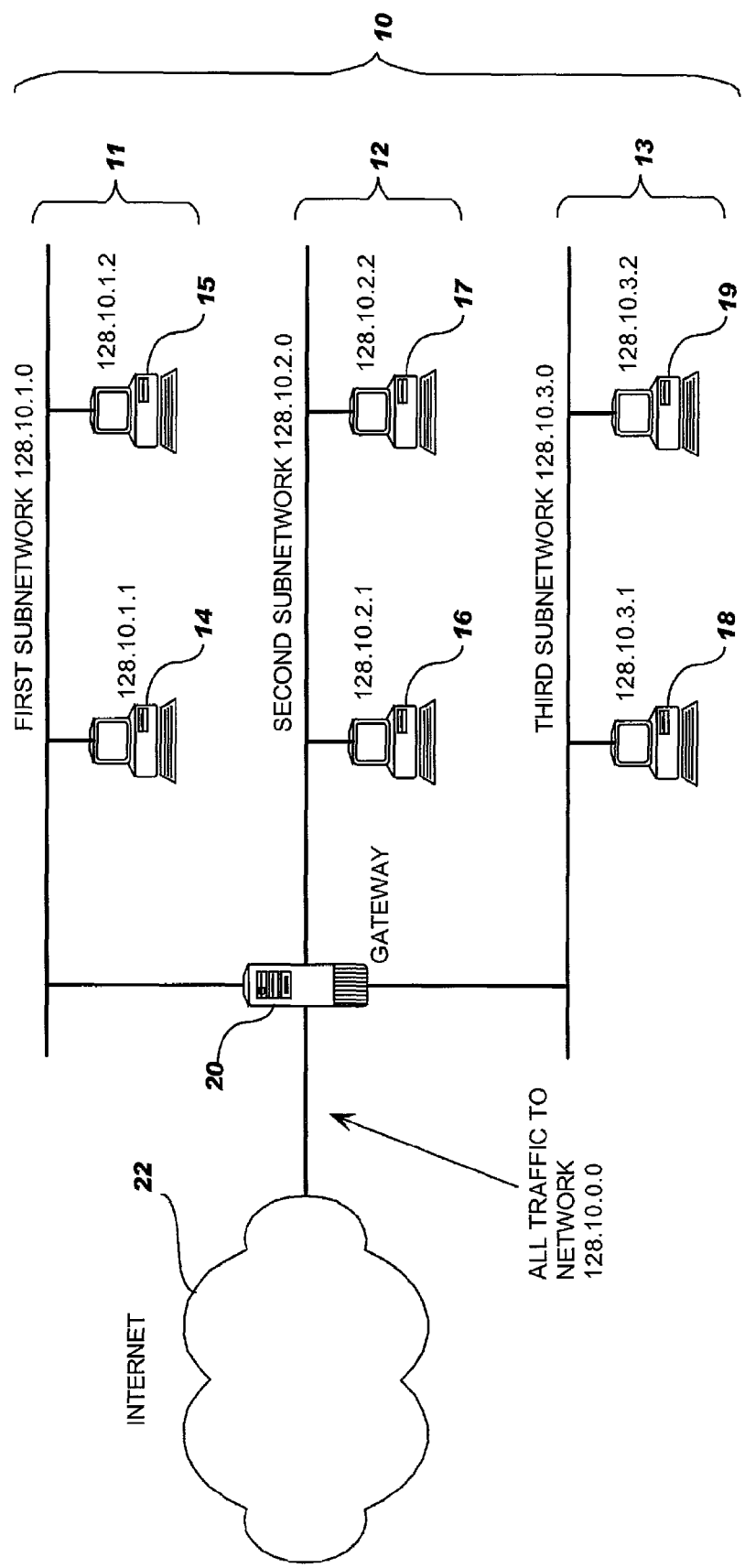
FIG. 1 is a symbolic diagram of a exemplary prior art network.
Figure 2:
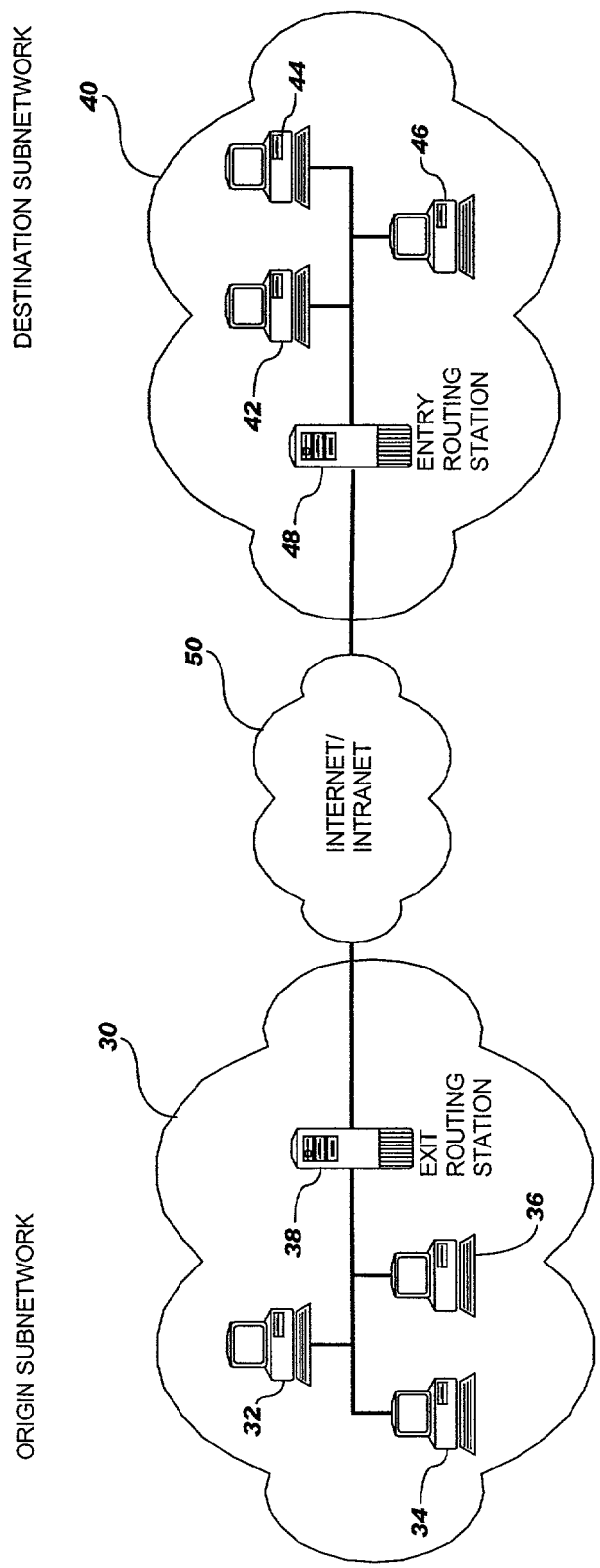
FIG. 2 is a symbolic diagram of an exemplary network in accordance with the present invention.
Figure 3:
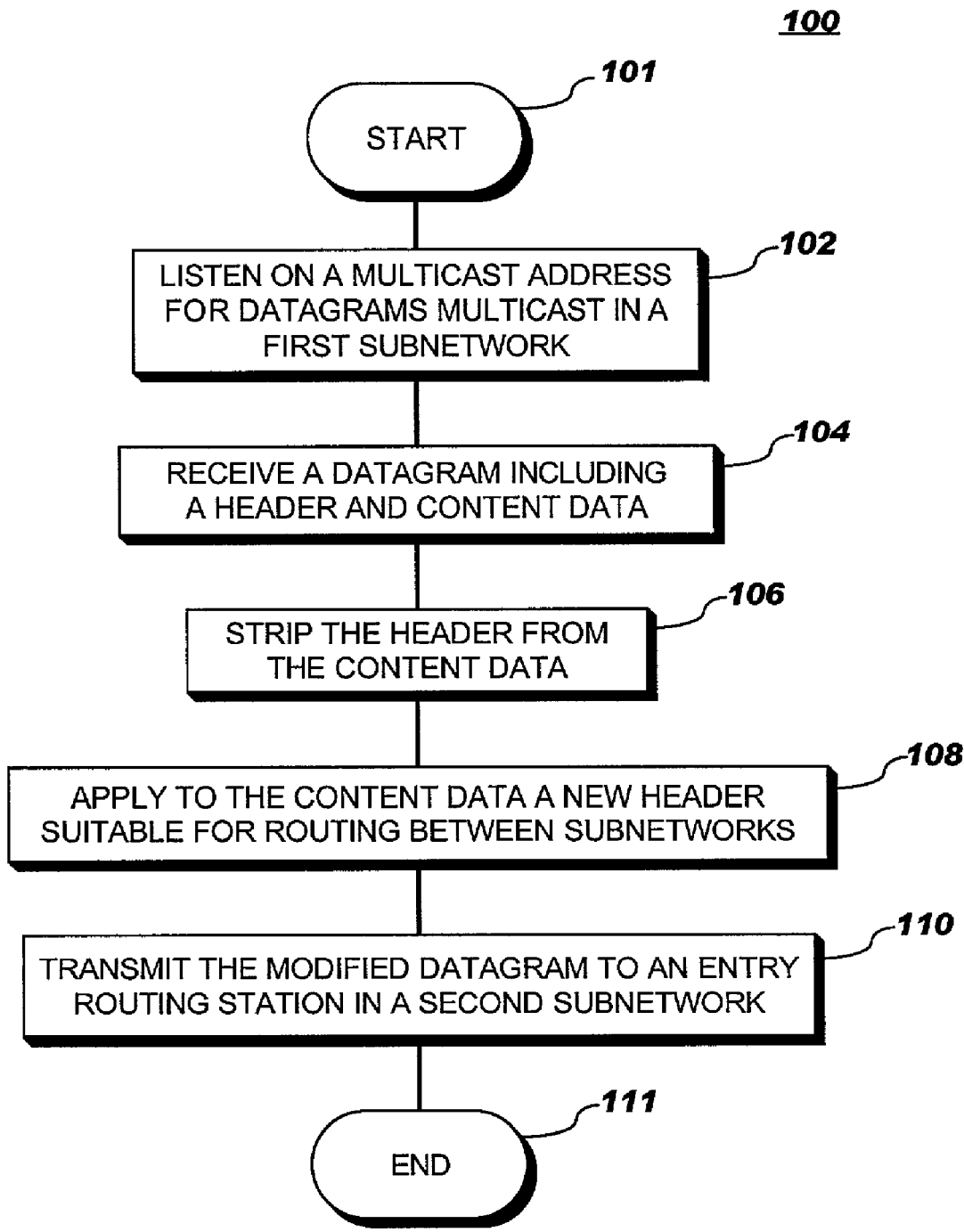
FIG. 3 is a flow diagram of an exemplary embodiment of the present invention, shown from the perspective of an exit routing station of an origin network.
Figure 4:
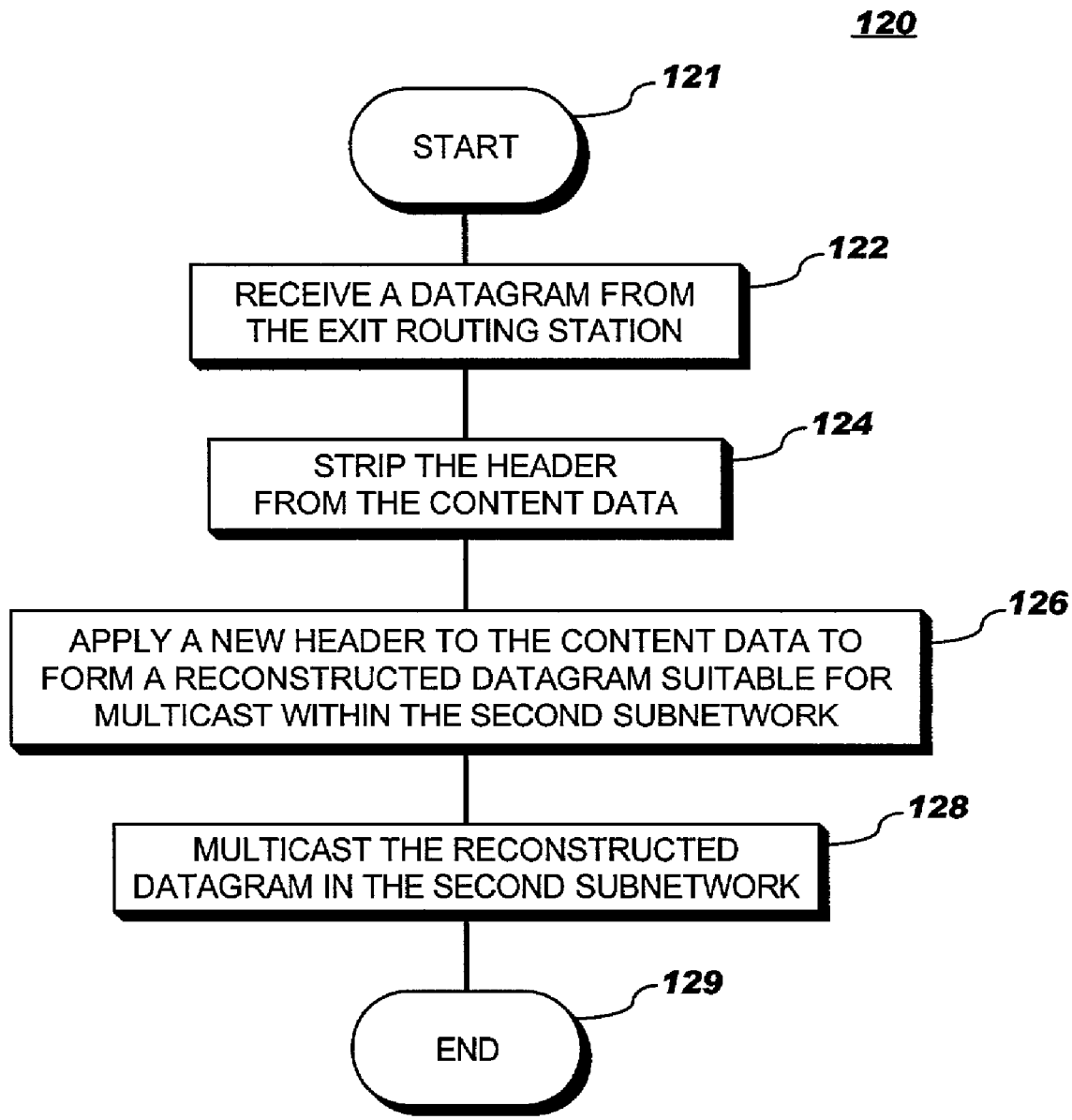
FIG. 4 is a flow diagram of an the exemplary embodiment of FIG. 3, shown from the perspective of an entry routing station of a destination network.

The invention may be better understood with reference to FIGS. 2–4. FIG. 2 is a symbolic diagram of an exemplary communications network in accordance with the present invention. In the example of FIG. 2, the communications network includes an Internet or intranet portion 50 interconnecting hosts 32, 34 and 36 of a first (origin) subnetwork 30 to hosts 42, 44, 46 of a second (destination) subnetwork 40. In this example, each of the subnetworks 30, 40 is a domain within which local multicasting may be performed. Due to network configuration, TTL and/or hop limits, and lack of multicast support by intervening routers/gateways, local multicasting may not be performed across the first and second subnetworks 30, 40. In other words, known techniques are insufficient for efficiently sending (e.g. without inefficiently high TTL's resulting in network flooding) a single multicast communication to cause delivery to all hosts in both subnetworks. For this example, it is considered that subnetwork 30 is a U.S.-based subnetwork of the ABC Corporation and subnetwork 40 is a Japan-based subnetwork of the XYZ Corporation. It is further considered that a multicast communication is sent from origin subnetwork 30 and is intended for delivery to hosts in destination subnetwork 40.

In accordance with the present invention, each subnetwork is provided with a routing station. For example, a routing station may include a server computer connected to the network. An exemplary routing station is discussed below with reference to FIG. 5. Because subnetwork 30 is the origin subnetwork in the example of FIG. 2, its routing station is the exit routing station 38. The exit routing station 38 is configured to receive communications intended for delivery, e.g. multi-recipient (multicast) delivery, in the origin subnetwork 30, particularly those intended for multi-recipient delivery in the destination subnetwork. The exit routing station 38 is specially configured with software for carrying out the inventive method, e.g. to assist the communication in exiting the origin subnetwork 30. FIG. 3 is a flow diagram 100 of an exemplary embodiment of such a method, shown from the perspective of the exit routing station 38.

As shown in FIG. 3, the method starts with "listening," i.e. monitoring or otherwise detecting communication, on a multicast address for datagrams multicast in the first subnetwork 30, as shown at steps 101, 102. Alternatively, the exit routing station 38 may otherwise receive a datagram, e.g. by unicast. Suitable techniques are well known in the art.

The exit routing station 38 then receives a datagram, as shown at step 104. Methods, hardware and/or software for performing this step are well known in the art. The datagram, e.g. a UDP datagram, includes a header containing header data for routing the datagram to the exit routing station 38 in the first subnetwork 30. For example, the header data may include information relevant only for permitting multicasting within the first subnetwork 30, such as TTL=1. The datagram also includes content data intended for multi-recipient delivery in the destination subnetwork. For example, the content data may include text stating "Please join the departmental telephone conference at 2:00 pm EST by dialing telephone number 999-999-9999." This content data may have also been intended for multi-recipient delivery, and have been delivered, to multiple hosts, e.g. 32, 34, 36 within the first subnetwork 30.

The exit routing station modifies the datagram(s) to render it/them suitable for routing from the origin subnetwork 30 (exit routing station 38) to the destination subnetwork 40 (entry routing station 48). In this embodiment, the exit routing station 38 does so by stripping the header from the datagram to expose the content data, as shown in step 106. Methods, hardware and/or software for stripping such a header are well known in the art. The header data can be stripped because it is no longer necessary, i.e. for routing the content data to the destination subnetwork 40 and/or within the destination subnetwork 40. This step may be unnecessary in some embodiments, e.g. when the message does not contain header data or the header data is stripped before or after reaching the routing station, or by a separate process. Any header data that must be retained or used to create a new header may be temporarily stored, e.g. at the destination routing station, or in any other suitable way.

In this embodiment, a new header is then applied, as shown at step 108. The new header is specially configured to be suitable for routing between subnetworks. Methods, hardware and/or software for applying headers are well known in the art. For example, the header may be configured for HTTP or RMI routing, e.g. unicast routing. Similar techniques are known for TCP tunneling. In this manner, the datagram is routable outside of the origin subnetwork, and particularly, across subnetworks to the destination subnetwork.

In alternative embodiments, the exit routing station of the origin domain modifies the datagram to render them suitable for routing to the destination domain in different manners. For example, the exit routing station may alternatively wrap the header in a new outer header wrapper. Alternatively, the entry routing station may simply modify the existing header, i.e. change parts of the header's header data.

Finally, the exit routing station 38 transmits the modified datagram via the Internet/intranet 50 to an entry routing station in the destination subnetwork 40, as shown at step 110. This step may be performed using methods, hardware and/or software well known in the art, e.g. standard "send IP" techniques. For example, such transmission may be made via HTTP or RMI sockets, or any other unicast delivery system implemented by the routing stations. This allows the multi-recipient communication to reach the entry routing station and to traverse intermediate firewalls.

Encryption or other security measures may be employed at the routing stations to add an additional layer of security to the communications process. The entry routing station is specially configured for receiving the datagram(s), modifying for local multi-recipient delivery, and initiating local multi-recipient delivery, as discussed further below with reference to FIG. 4.

In one embodiment, step 110 requires the step of selectively identifying from a database information for routing to the intended entry routing station. For example, this database may be a routing table or configuration table stored at the exit routing station 38. Alternatively, the intended entry routing station may be identified by a rules-based engine in the origin and/or destination networks, e.g. at the routing station. This routing information is then specified in the new header to cause the content data to be routed to the intended entry routing station(s). For example, the datagram(s) may be sent to specified subnetworks, e.g. those identified in routing tables, configuration tables, rules tables, etc. By way of further example, a rule may specify that all messages originating from subnetwork A are distributed to subnetworks B and D.

In an alternate embodiment, step 110 requires the step of identifying from a database information for routing to a plurality of entry routing stations. In this alternate embodiment, an intended entry routing station is not identified, rather, the content data is sent to all entry routing stations of which the exit routing station 38 is aware. In this embodiment, the content data is transmitted to each of the plurality of entry routing stations. A separate, unique header may be applied for each destination subnetwork/entry routing station.

Referring again to FIG. 2, the destination subnetwork 40 includes the entry routing station 48. The entry routing station 48 is specially configured with software for carrying out the inventive method, e.g. to assist the communication in entering the destination subnetwork 30. FIG. 4 is a flow diagram 120 of exemplary entry routing station's method steps corresponding to the example of FIG. 3. As shown in FIG. 4, the method starts with the entry routing station's 48 receipt of the datagram from the exit routing station 38 of the origin subnetwork 30, as shown at steps 121, 122. From the perspective of the entry routing station, the datagram is received using methods, hardware and/or software for receiving network communications well known in the art, e.g. via a tunnel, RMI, HTTP, etc. In this manner, TCP delivery may be used to ensure reliable delivery to the destination subnetwork.

In this example of FIG. 4, the entry routing station 48 then strips the header, as shown at step 124. Methods, hardware and/or software for performing such unwrapping are well known in the art. The wrapper may be discarded because it is no longer useful and is not suitable for multi-recipient delivery, e.g. by UDP. This exposes the content data intended for multi-recipient delivery in the destination subnetwork 40.

In alternate embodiments, there may be different steps. For example, if the exit routing station does not strip the header but rather simply applies a new outer header/wrapper, the entry routing station may remove the outer header/wrapper and then strip or modify the remaining header.

In the example of FIG. 4, the entry routing station 48 then applies a new header to the content data to form a reconstructed datagram, as shown at step 126. The header applied, e.g. an IP header, is one suitable for multi-recipient delivery, e.g. multicast, within the second subnetwork 40. Methods, hardware and/or software for applying such a header are well known in the art. For example, the header may specify the second subnetwork and all hosts in the second subnetwork, e.g. using an all 1's approach well known in the art for broadcast delivery.

Step 126 may include intelligent modification of the communication. In other words, the entry routing station of the destination domain may use its "knowledge" of the destination domain to appropriately modify the communication for multi-recipient delivery in the destination domain. More specifically, the entry routing station may modify the communication by changing a port number or multicast address suitable for multi-recipient delivery in the destination subnetwork. In this manner, the message appears from the recipients' perspectives to have originated in the destination domain. Intelligent modification is particularly useful to ensure delivery to multiple recipients because of the less-reliable, "best efforts" nature of UDP multi-recipient techniques. If this intelligent modification were not performed, datagrams would not be deliverable any time all information necessary for multi-recipient delivery in the destination subnetwork was not initially specified by the sender in the origin domain. It would place an unreasonable burden on the sender to provide all such information, particularly when the communication is intended for multi-recipient delivery in multiple destination networks requiring different header data to enable multi-recipient delivery.

Additionally, the header may be modified to include an incremented TTL to permit additional hops required for multi-recipient delivery in the destination domain. This is particularly necessary to ensure delivery where existing application programs are configured to set insufficiently low TTL values for multi-domain routing.

Finally, the entry routing station 48 initiates multi-recipient delivery of the reconstructed datagram to hosts in the second subnetwork 40. For example, in one embodiment this step includes initiating multicast delivery by another hardware and/or software process. In an alternate embodiment, this step includes multicasting the reconfigured datagram in the destination domain. The method then ends.

In this manner, a broadcast message may be selectively routed, e.g. to all hosts within the first and second subnetworks, using known broadcasting techniques, and yet without reaching unwanted recipients or running afoul of limitations of known multi-recipient techniques.

It should be appreciated that is advantageous to further configure the exit routing station 38 to also perform the functions of an entry routing station, and to further configure the entry routing station 48 to also perform the functions of an exit routing station. In this manner, bi-directional, selective routing of multi-recipient communications may be achieved.

Figure 5:
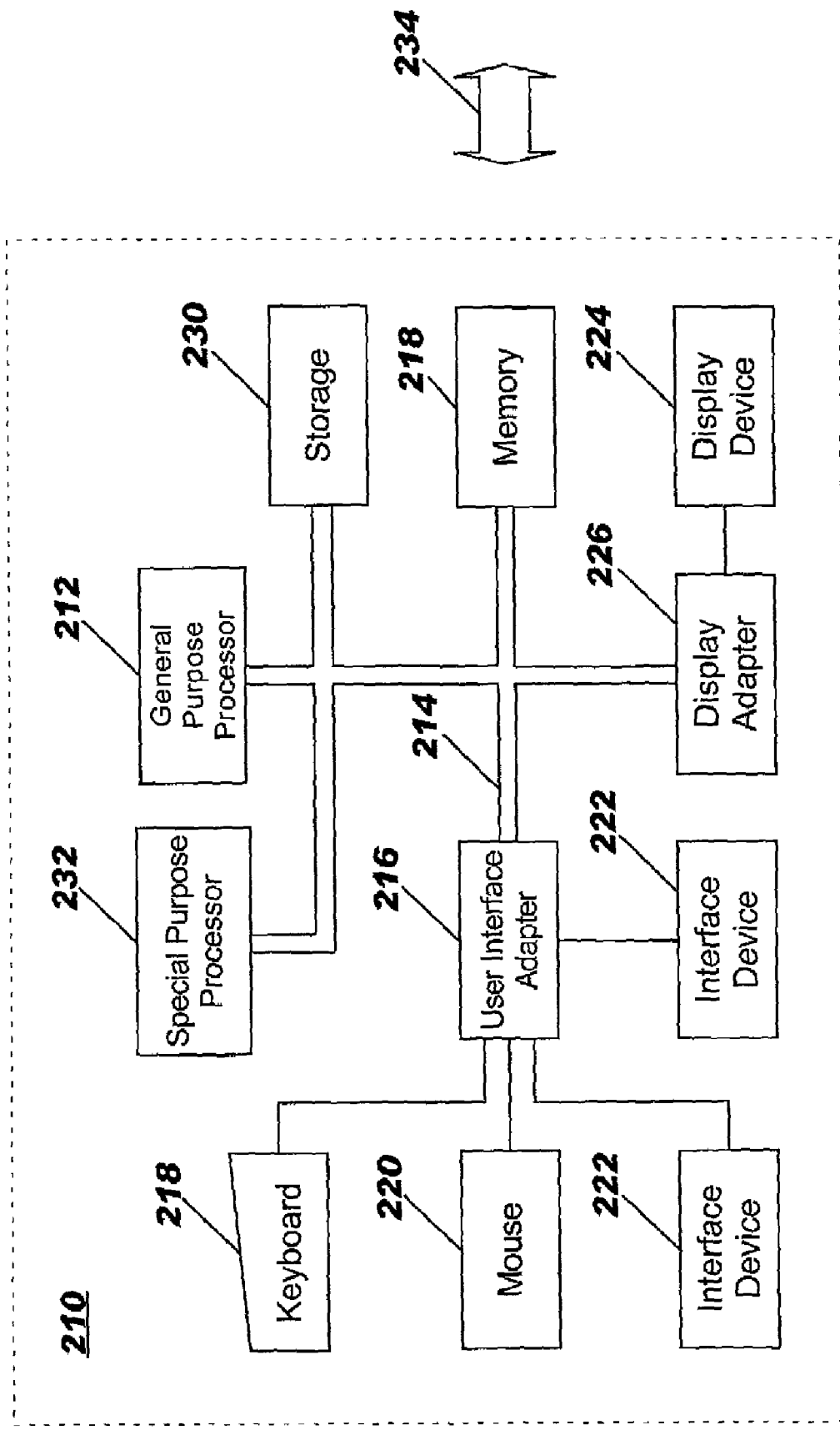
FIG. 5 is a block diagram of a routing station in accordance with the present invention.

FIG. 5 is a block diagram of a routing station 210 in accordance with the present invention. As is well known in the art, the routing station of FIG. 4 includes a processing device, e.g. a server, such as a personal computer, including related peripheral devices. The routing station 210 includes a general purpose microprocessor 212 and a bus 214 employed to connect and enable communication between the microprocessor 212 and the components of the routing station 210 in accordance with known techniques. The routing station 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 (collectively, "memory") which can include a hard drive, diskette drive, tape drive, etc.

The routing station 210 may communicate with other computers or networks of computers, for example via a communications channel, network card or modem 234. The routing station 210 may be associated with such other computers in a LAN or a wide area network (WAN), or the workstation 210 can be a server in a client/server arrangement with another computer, etc. All of these configurations, as well as the appropriate communications hardware and software, are known in the art.

Software programming code embodying the present invention is typically stored in memory of some type, such as the memory 228 and/or storage 230. The routing station 210 may be configured as an exit routing station when it stores microprocessor executable instructions including first instructions for receiving a datagram comprising content data intended for multi-recipient delivery in a destination domain, second instructions for modifying the datagram for routing from the origin domain to the destination domain, and third instructions for transmitting via the communications network the modified datagram to an entry routing station of the destination domain, the entry routing station being capable of initiating multi-recipient delivery in the destination domain. Optionally, the exit routing station may store fourth instructions for retrieving information indicating parameters, e.g. port numbers, multicast addresses, TTL values, origin address, destination address, etc., for delivery to the destination domain.

The routing station 210 may be configured as an entry routing station when it stores microprocessor executable instructions including first instructions for receiving a datagram configured for routing from the origin domain to the destination domain, the datagram including content data intended for multi-recipient delivery in the destination domain, second instructions for modifying the datagram to form a reconstructed datagram, e.g. by applying a new header to the content data, the reconstructed datagram being suitable for broadcast broadcast routing in the destination domain, and third instructions for initiating multi-recipient delivery in the destination domain. Optionally, the routing station stores microprocessor executable instructions for retrieving information indicating parameters for multi-recipient delivery in the destination domain.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for selective routing of a multi-recipient communication from an origin domain to a destination domain of a communications network, said method comprising:
   receiving, at an exit routing station of the origin domain, a datagram comprising content data intended for multi-recipient delivery in a destination domain;
   modifying the datagram to render it suitable for routing from the origin domain to the destination domain; and
   transmitting via the communications network the modified datagram to an entry routing station of the destination domain, the entry routing station being configured to initiate multi-recipient delivery in the destination domain,
   wherein modifying the datagram comprises
   wrapping the datagram with a wrapper suitable for routing from the origin domain to the destination domain.

2. A method for selective routing of a multi-recipient communication from an origin domain to a destination domain of a communications network, said method comprising:
   receiving at an entry routin station of the destination domain, a datagram configured for routing from the origin domain to the destination domain, the datagram comprising content data intended for multi-recipient delivery in the destination domain;
   modifying the datagram to form a reconstructed datagram, the reconstructed datagram being suitable for multi-recipient routing in the destination domain; and
   initiating multi-recipient delivery of the reconstructed datagram in the destination domain,
   wherein modifying the datagram comprises
   removing a wrapper applied to the datagram in the origin domain; and
   modifying a header of the datagram suitable for routing in the origin domain to create a header suitable for routing in the destination domain.

3. The method of claim 2, wherein the wrapper removed comprises an HTTP or RMI header.

4. An exit routing station for selective routing of a multi-recipient communication to a destination domain, said exit routing station comprising:
   a microprocessor;
   a memory operatively connected to said microprocessor;
   a telecommunications device operatively connected to said microprocessor and capable of communicating via a communications network;
   first instructions stored in said memory and executable by said microprocessor for receiving a datagram comprising content data intended for multi-recipient delivery in a destination domain;
   second instructions stored in said memory and executable by said microprocessor for modifying the datagram to render it suitable for routing from the origin domain to the destination domain;
   third instructions stored in said memory and executable by said microprocessor for transmitting via the communications network the modified datagram to an entry routing station of the destination domain, the entry routing station being configured to initiate multi-recipient delivery in the destination domain; and
   fourth instructions stored in the memory and executable by said microprocessor for retrieving information indicating parameters for delivery to the destination domain.

5. An entry routing station for selective routing of a multi-recipient communication received from an origin domain, said entry routing station comprising:
   a microprocessor;
   a memory operatively connected to said microprocessor;
   a telecommunications device operatively connected to said microprocessor and configured to communicate via a communications network;
   first instructions stored in said memory and executable by said microprocessor for receiving a datagram configured for routing from the origin domain to the destination domain, the datagram comprising content data intended for multi-recipient delivery in the destination domain;
   second instructions stored in said memory and executable by said microprocessor for modifying the datagram to form a reconstructed datagram, the reconstructed datagram being suitable for multi-recipient routing in the destination domain;
   third instructions stored in said memory and executable by said microprocessor for initiating multi-recipient delivery of the reconstructed datagram in the destination domain; and
   fourth instructions stored in said memory and executable by said microprocessor for retrieving information indicating parameters for multi-recipient delivery in the destination domain.

* * * * *

UNITED STATES PATENT AND TRADEMARK OFFICE
CERTIFICATE OF CORRECTION

| | |
|---|---|
| PATENT NO. | : 7,039,052 B2 |
| APPLICATION NO. | : 09/955905 |
| DATED | : May 2, 2006 |
| INVENTOR(S) | : Fox et al. |

It is certified that error appears in the above-identified patent and that said Letters Patent is hereby corrected as shown below:

Claim 2, column 9, line 57, change "routin" to --routing--.

Signed and Sealed this

Twenty-ninth Day of August, 2006

JON W. DUDAS
*Director of the United States Patent and Trademark Office*